March 15, 1938.   S. BAGNO   2,111,135
APPARATUS AND METHOD FOR DETERMINING IMPEDANCE ANGLES
Filed March 1, 1935   2 Sheets-Sheet 1
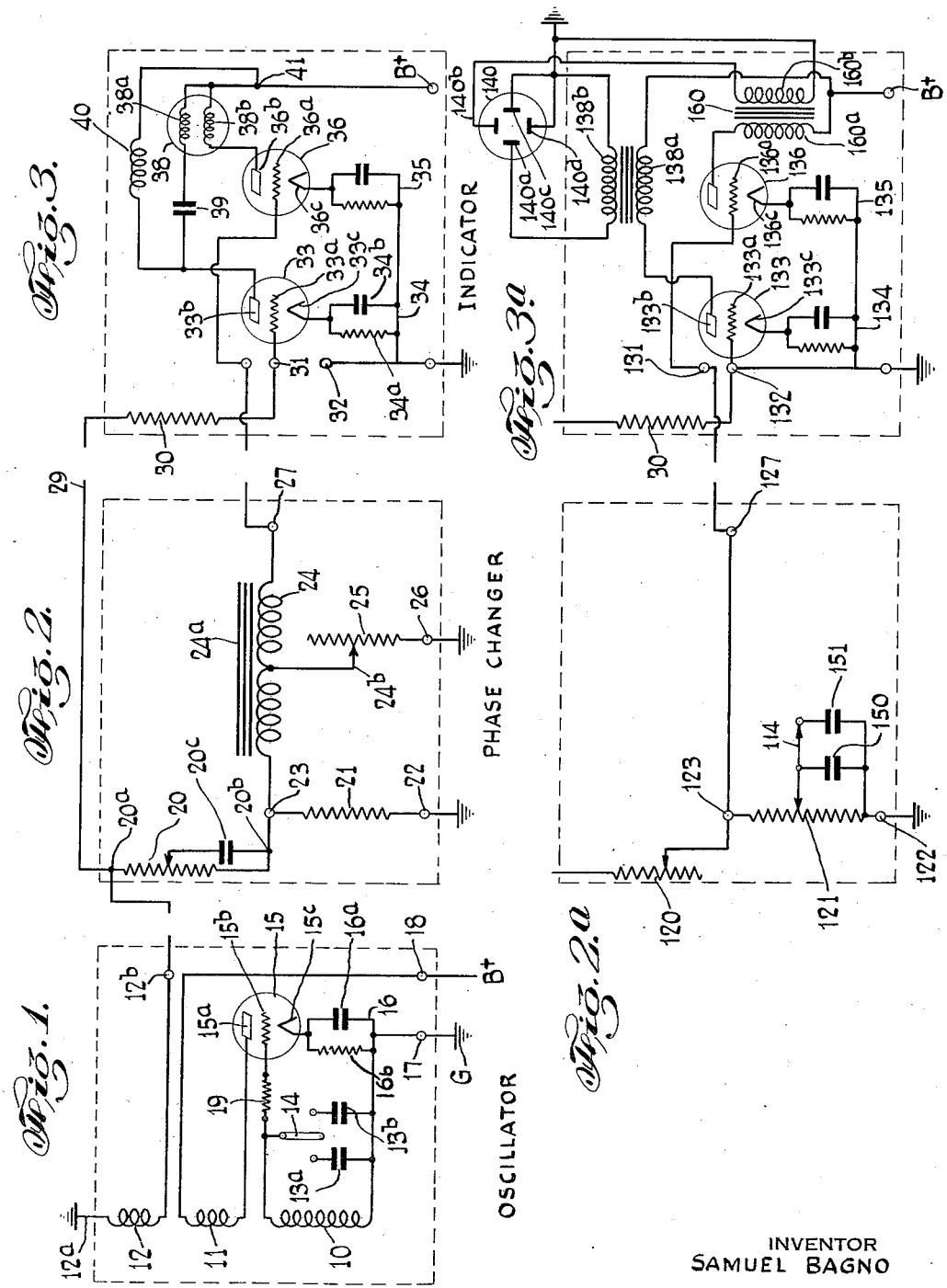
INVENTOR
SAMUEL BAGNO
BY
Louis Barnett
ATTORNEY March 15, 1938.  S. BAGNO  2,111,135

APPARATUS AND METHOD FOR DETERMINING IMPEDANCE ANGLES

Filed March 1, 1935  2 Sheets-Sheet 2

INVENTOR
SAMUEL BAGNO

BY Louis Barnett
ATTORNEY

Patented Mar. 15, 1938

2,111,135

UNITED STATES PATENT OFFICE 2,111,135

APPARATUS AND METHOD FOR DETERMINING IMPEDANCE ANGLES

Samuel Bagno, New York, N. Y., assignor to Louis Barnett

Application March 1, 1935, Serial No. 8,841

16 Claims. (Cl. 128—2.1)

The present invention relates to electrical methods and apparatus for measuring or testing phase displacement and, more particularly, for measuring the electrical phase displacing properties or impedance angle of humans, animals and vital tissues. One of the more interesting uses of the invention is its clinical application to human beings in diagnosing thyroid conditions hereinafter to be described.

It has been found that normal human individuals, have an electrical impedance property giving phase displacement values of .100 to .121 for women and of .126 to .150 for men. These measurements are preferably made by immersing the arms of the individual to be tested in one per cent saline solution contained in separate arm baths and passing an alternating current having a frequency of at least 9000 cycles through the individual under test, lead electrodes serving to carry current into the baths.

Whenever the phase displacement values are found to be less than .100 for women or .126 for men, a clinical condition of hyperthyroidism, generally designated as Graves' or Basedow's disease, is believed to exist. On the contrary, when the phase angle values run above .121 for women or .150 for men, a condition of hypothyroidism is believed to exist which, in extreme cases, indicates myxoedema or cretinism. Inasmuch as low phase angle values appear in hyperthyroidism and high values in hypothyroidism, it is more convenient to express the phase displacement values in terms of the impedance angle which is the complement of the phase angle value. An increase in impedance angle thus indicates hyperfunction of the thyroid glands and a decrease, hypofunction of this organ.

In the past, the phase angle values of individuals have been determined by means of a Wheatstone bridge, a resistance and a capacity connected in parallel and constituting one arm of the bridge being successively balanced with the person to be measured connected in circuit in another arm of the bridge. Phase angles were then calculated in the well known manner from the values of resistance and capacity thus found by multiplying their product by the form factor $2\pi f$, where $f$ is the frequency.

When measurements are made using a Wheatstone bridge in the manner above described, it is found that the values for resistance read on the bridge vary with changes in the state of muscular tension or relaxation of the person. Thus, a turning movement of the head or contraction of the biceps changes the resistance reading. Similar variations occur when capacity adjustments are being effected. If however phase angle determinations are made directly without successive settings for resistance and capacity as required by a bridge, errors due to variation of muscular tension and relaxation are eliminated.

Among the objects of the invention is the provision of an apparatus for determining phase angles on human subjects, animals, and vital tissues which shall comprise few and simple parts and which shall be inexpensive to manufacture, and a method for making such determinations which give reliable and accurate results even in unskilled hands, said apparatus and method being practical and efficient to a high degree in use.

Other objects of this invention will be in part obvious and in part hereinafter pointed out.

The invention accordingly consists in the features of construction, combinations of elements and arrangement of parts which will be exemplified in the constructions and method hereinafter described and of which the scope of application will be indicated in the following claims.

In the accompanying drawings, various possible illustrative embodiments of this invention are shown.

Figure 1 is a diagrammatic view of an oscillator used in the embodiment of the invention here described.

Figure 2 is a diagrammatic view of a phase changing device embodying the invention adapted to be connected to the oscillator shown in Figure 1.

Figure 2a is a diagrammatic view showing another form of phase changing device adapted to be used in place of the one shown in Figure 2.

Figure 3a is a diagrammatic view showing another form of phase indicator incorporating in circuit a cathode ray tube and capable of being used interchangeably with the one shown in Figure 3.

Figure 3b is a diagrammatic view showing still another form of phase indicator also of the cathode ray type adapted to be used in conjunction with the oscillator and a phase changer.

Figure 3:
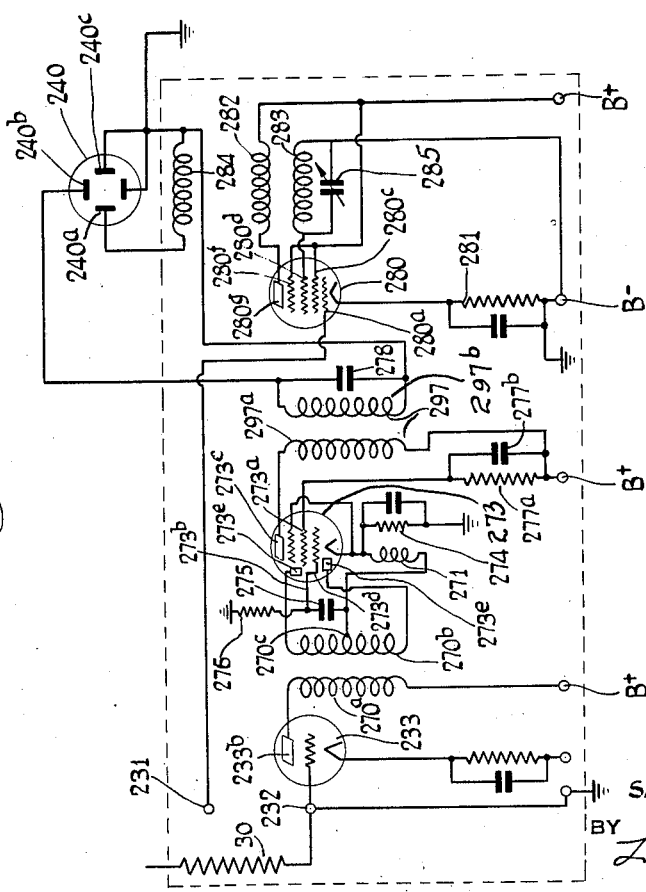
Figure 3 is a diagrammatic view showing a phase indicator embodying the invention adapted to be used in conjunction with the phase changer shown in Figure 2 or Figure 2a, and the oscillator shown in Figure 1.

For practising the invention, a complete phase measuring apparatus or instrument may be used comprising a conventional type of oscillator, shown diagrammatically in Figure 1, feeding a phase changer, shown diagrammatically in either Figure 2 or 2a, the latter being connected to any one of the phase indicators shown diagrammatically in Figures 3, 3a, or 3b. Another modification of the invention may be had by connecting the oscillator directly to a type of phase determining device, such as is shown diagrammatically in Figure 4.

The oscillator may be of any suitable construction preferably capable of generating current of 9000 cycles or more, as for example of the so-called Hartley's series type shown diagrammatically in Figure 1, operating from a 60 cycle current source. Said oscillator comprises a triode tube 15 whose plate 15a is connected through a plate coil 11 to the B+ terminal of a battery at 18, a grid 15b connected to a resistance 19 and a tuned grid coil 10 shunted by condenser 13a or 13b capable of being selectively brought into the circuit by a switch 14 for producing either one of two predetermined frequencies, and a cathode 15c provided with current from a power source (not shown) in the well understood manner. The cathode is connected in circuit through a self-biasing arrangement 16 comprising a condenser 16a and a shunted resistance 16b as shown. The grid-cathode circuit is grounded at 17. Resistance 19 serves to stabilize the oscillation while self-biasing arrangement 16 aids in maintaining the current supply to the cathode at constant value. The oscillator is completed by a pick-up coil 12 connected at one end 12a to the ground, and at its other terminal end 12b to one of the phase changers shown in Figure 2, Figure 2a or Figure 4.

The phase changer shown in Figure 2 receives current at 20a from terminal 12b of the oscillator and connects via conductor 29 directly to the phase indicator and also to series connected resistances 20, 21, which are grounded at 22. A center tap transformer 24 provided with an iron core 24a is connected at 23 between resistances 20, 21 so that said resistances function as a voltage divider. Transformer 24 through terminal 27 connects with the phase indicator. The center tap 24b of the transformer 24 is made adjustable to slide along a resistance 25 which is grounded at 26. By varying the effective value of resistance 25, the phase of the circuit may be varied as desired.

The phase indicator shown in Figure 3 is provided with a pair of terminals 31, 32 between which the subject or object (not shown) to be tested is connected in circuit. Terminal 32 is grounded as shown while terminal 31 receives current from the oscillator and phase changer via conductor 29 through the intermediary of a resistance 30 of sufficient value to permit the impedances inserted for test between terminals 31 and 32 to vary considerably, as for example from 100 to 1000 ohms, without substantially affecting the phase angle measurements obtained on human or similar vital material. In the apparatus and method here shown and described, resistance 30 if made above 5000 ohms gives good results on humans. Terminal 31 is connected directly to the grid 33a of a triode tube 33. The cathode 33c of this tube is provided with a self-biasing arrangement 34 for reducing the current consumption to a minimum, said bias 34 being composed of a resistance 34a and a condenser 34b connected in circuit with terminal 32. Plate 33b of this tube connects through a condenser 39 to one coil 38a of a wattmeter 38, the condenser 39 serving as a barrier against direct current from plate 33b. This current from said plate 33b is tapped off into a choke coil 40 connected into the circuit as shown in Fig. 3, said choke coil 40 serving as a barrier against alternating current.

Terminal 27 of the phase changer connects with a grid 36a of another triode tube 36 whose cathode 36c is provided with self-biasing arrangement 35 similar to bias 34 and connected in circuit to the latter as shown. Current from plate 36b of triode tube 36 flows into a second coil 38b of the wattmeter which is connected at 41 with the choke coil 40 and the B+ of the battery.

The manner in which the apparatus shown in Figures 1, 2 and 3 cooperate to determine the phase angle of a human subject or object to be tested is now apparent. Power is supplied for the main circuit and the A and B battery supply (not shown) to tubes 15, 33 and 36 from the outside in the well understood manner. By setting switch 14 on either condenser 13a or 13b there will be generated an oscillating current of predetermined frequency feeding the phase changer through junction 20a. The output of the oscillator is divided into two parts, one going into the phase changer via resistance 20 and the other passing directly to the body or object under test at terminal 31 via conductor 29 and resistance 30. Resistance 20 is preferably constructed as a potentiometer for reasons to be explained further on. A pure (non-inductive) resistance is first inserted between terminals 31 and 32 and variable resistance 25 is adjusted so that the current passing through wattmeter coils 38a and 38b is 90° out of phase. The wattmeter will then read zero. The pure resistance is then removed and the subject or object to be tested is inserted in its place between terminals 31 and 32. If a human body is being tested, the wattmeter will move off the zero point by an amount corresponding to the value of the capacity component of the body impedance. The value of the variable resistance 25 is then changed to bring the wattmeter reading back to zero and the change in resistance 25 thus effected may be calibrated to read directly in terms of phase angle. Variable resistance 25 is preferably made in the form of a sliding contact connected to a rotatable point moving over a dial (not shown) calibrated to read directly in phase or impedance angle values.

If desired, a known impedance may be inserted between points 31 and 32 to serve as a standard and deviation of resistance 25 from a proper reading may be corrected by changing resistance potentiometer 20 which has a condenser 20c in shunted relation as shown in Fig. 2.

It will thus be seen that an apparatus is provided wherein the resistance and capacity adjustments need not be separately made for determining the phase angle as is required in a bridge. The apparatus and method employed are also independent of impedance variations such as infants and adults present comparatively to one another. All calculations are eliminated and phase angle values are read off directly on a dial. Tubes 33 and 36 are used to isolate the wattmeter electrically (but not functionally) from the impedance under test since, if the wattmeter coils were connected to the output of the phase changer and the body, the load characteristics might so disturb the phase angle as to make it dependent on the impedance which it is desired to measure.

Inasmuch as the extreme phase angle variations on different humans lie inside the range of about 6°, a simplified form of phase changer, such as shown in Figure 2a, may be used in lieu of the one represented in Figure 2. Here, current flows from conductor 12b into resistances 120 and 121 the latter being connected to the ground at 122. Either or both of a pair of condensers 150, 151, depending on the frequency generated in the oscillator may be shunted across the variable resistance by means of a switch 114. The junction 123 connects to terminal 127 to feed to the phase indicator in the manner similar to the connection from terminal 27 in the construction shown in Figure 2. A glance at Figures 2 and 2a will show that both of the units illustrated therein function to give the same end effect.

If it be desired to use a cathode ray tube instead of a wattmeter as a null instrument, an indicator of the type shown in Figure 3a may be used instead of the one represented in Figure 3. Here, current coming from the oscillator and phase changer passing through resistance 30 is fed to terminal 132 which is connected to the grid 133a of a triode tube 133. The cathode 133c of this tube is provided with a self-biasing arrangement 134 while the plate 133b circuit feeds the primary 138a of a transformer whose secondary 138b is connected across deflector plates 140a and 140c of cathode ray tube 140. The terminal 27 or 127 connects with the terminal 131 then to the grid 136a of a triode tube 136 whose cathode 136c is provided with a self-biasing arrangement 135 as shown. The plate of tube 136 feeds the primary 160a of a transformer 160 whose secondary 160b is connected at one end to the plate 149d of the cathode ray tube 140 which is grounded, and at the other end of said secondary to cathode ray deflector plate 140b. Current is supplied to the plates of tubes 133 and 136 from the B supply, the filaments of said tubes having an A supply (not shown).

It will be noted that when the voltages between the deflector plates of the cathode ray tube 140 are in phase a null indication will appear on the cathode ray screen as a straight line (not shown) in the well understood manner. When the voltages are out of phase, the image on the screen changes to an ellipse or a circle. The width of this ellipse may be calibrated to give readings directly in terms of phase angle.

This form of indicator operates in the following manner: A pure or non-inductive resistance is inserted between terminals 131 and 132 and the value of variable resistance 25 or 121, depending on which is being used, is adjusted so that the screen image is a straight line. The pure resistance is then removed and the body to be measured, a human subject for example, is inserted instead. The image on the screen will then take the form of an ellipse and it suffices to vary the value of resistance 25 or 121 which is calibrated to correspond to phase angle to change the image back to a straight line and thus measure the phase difference caused by the human body.

Inasmuch as the phase changes obtained in measurements on human subjects are small and since, in addition, it is extremely desirable to have very accurate measures of phase angle in border line cases which are near the limit between the normal and hyper or hypothyroidism, a micro-phase indicator shown in Figure 3b may be used which amplifies the phase angle by means of a change in frequency.

Such a modification of phase indicator is shown in Figure 3b. In this last modification, a tube 233 is used connected with the body to be tested in the same manner as described above for tubes 33 and 133. The output of plate 233b of this tube is fed to the primary of a transformer 270a which connects with a B+. The secondary of said transformer 270b is center tapped at 270c which connects with a choke coil 271 of a double diode pentode 273, said tube having a self-biasing arrangement 274. The ends of the coil 270b are connected to the spaced diodes 273e as shown. The control grid 273d is connected through a condenser 275 to the center tap 270c. This grid 273d may also be grounded through a resistance 276 which supplies the bias thereof. The screen grid 273a is connected through a resistance 277a and shunting condenser 277b to the B+.

The plate 273c of the tube 273 is connected to a primary coil 297a of a tuned transformer 297 adjusted to a multiple or harmonic of the frequency of the oscillation used. The secondary 297b, which has a condenser shunt 278, has one end connected to deflector plate 240b of a cathode ray tube 240. The phase changer terminal 27 or 127 is connected through terminal 231 to the control grid 280a of a pentagrid converter tube 280 having a self-biasing arrangement 281 connecting with the B— or ground.

Grids 280c and 280f of the converter tube 280 are connected together to B+ in order to reduce the space charge within the tube. The grid 280d and the plate 280g are connected in an oscillating circuit consisting of plate coil 282 and grid coil 283 and adjustable condenser 285 shunts the latter for the purpose of distorting the current and thereby generating and oscillating a harmonic of the frequency applied to the grid 280a; a coil 284 is connected to the end of secondary 297b, said coil 284 being connected to the end of secondary 297b opposite that joining the cathode deflector plate 240b, said coil 284 being inductively coupled to coils 282 and 283. The harmonic generated is the same harmonic which is selected by the tuned transformer 297. The output from these oscillating coils is fed through the coil 284 to opposite cathode ray deflector plates 240a, 240c. The purpose of this arrangement is to amplify the phase difference so that the amount of amplification depends on the number of the harmonic used, as for example 1 to 10. For instance, if the frequency used for measuring the phase angle is 10,000 cycles a second and the 10th harmonic of this frequency is selected, a five degree deviation at 10,000 cycles will show up as a 50 degree deviation at its 10th harmonic of 10,000 cycles and thereby make the indicating device considerably more sensitive to differences in phase angles. In using this latter indicator, the adjustments are made for the pure resistance and the body to be measured in the same manner described above, the adjustments being made at the potentiometer 25 or 121.

From the foregoing, it will be seen that a current sinusoidal in character used for testing is converted into non-sinusoidal form and a harmonic thereof is then selected from this non-sinusoidal wave form for amplification.

It is to be understood that the wattmeter arrangement shown in Figure 3 may also be provided with a frequency type amplifier such as is shown in Figure 3b, the circuits being modified in a manner apparent to those skilled in the art and suggested by comparison of Figures 3, 3a and 3b.

Figure 4:
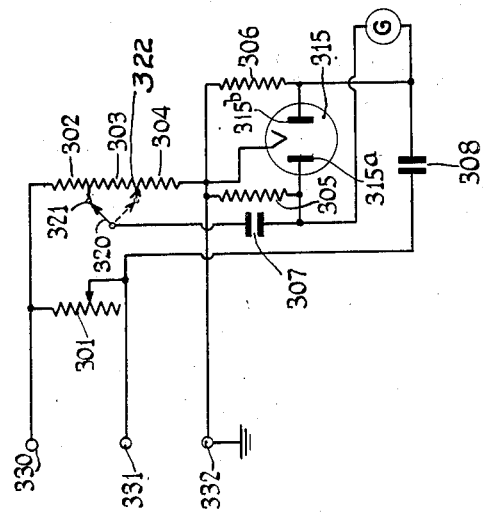
Figure 4 is a diagrammatic view of another device adapted to be connected with an oscillator for determining phase differences by the method embodying the invention.

In the form of phase measuring device shown in Figure 4, the oscillator unit is connected directly to a device capable of indicating phase displacement and may serve the combined purpose of the phase changer shown in Figure 2 or 2a and the phase indicator represented in Figures 3, 3a or 3b.

The oscillator is connected across a pair of terminals 330, 332 and the body (not shown) to be measured is inserted between a first body terminal 331 and the aforesaid terminal 332. The current flowing from the oscillator into terminal 330 is divided into two paths, one going through a variable resistance 301 which may have a function like resistance 30 described above, and the body in series therewith to the ground, and the other passing through a resistance 302, in series with a potentiometer 303, 304 and various other circuit parts hereinafter to be described including a diode tube 315, a galvanometer, G, a pair of resistances 305 and 306 serving to conduct direct current back to the tube cathodes 315a and 315b, respectively, and a pair of condensers 307 and 308 functioning to filter out direct current from the various resistances.

This apparatus functions in the following manner. A switch 320 is connected to terminal tap 321 between resistance 302 and potentiometer 303, 304. Variable resistance 301 is then adjusted until the alternating current voltage across the test body inserted between terminals 331 and 332 is equal to the alternating current voltage across potentiometer 303, 304, this being indicated by a zero reading of the galvanometer, G. Switch 320 is then thrown to connect with a slider 322 of the potentiometer. The body is then disconnected from terminals 331 and 332, and a large condenser (not shown) preferably of approximately 100 times the body capacity is substituted. Slider 322 is then adjusted until the galvanometer, G, again indicates zero. The test body is now thrown across the aforementioned large condenser and the differential in the galvanometer reading will be found to be directly proportional to the phase angle. It will be noted that tube 315 and the galvanometer, G, constitute a differential alternating current voltmeter.

The reasons underlying the various adjustments and operations hereinabove described are the following. When the test body is inserted between terminals 331 and 332 and rheostat 301 is adjusted to give a zero galvanometer reading, the voltage drop across the body impedance will have a fixed value regardless of the value of the body impedance itself. Under these conditions the resistance introduced by rheostat 301 will be the factor which governs the current through that path of the circuit. When an additional capacity is added in the form of the large condenser, the additional voltage drop produced by this additional capacity will be proportional to the additional capacity reactance divided by the body impedance which equals the phase angle, provided that the value of resistances 305 and 306 are sufficiently high value i. e. about 100 times test body impedance, and the voltage drop across the test impedance will produce only a negligible error.

It will thus be seen that the apparatus shown in Figure 4 will operate to give phase angle values utilizing a galvanometer instead of a wattmeter or a cathode ray tube.

Irrespective of the particular form of apparatus above described chosen to measure phase angles, the current employed is imperceptible when used on human subjects, the maximum voltage used on the subject being approximately 1.5. The use of such apparatus is not only to avoid discomfort, but also, and especially when used on children, introduces no special sensation capable of producing fright.

Obviously the invention is not limited to a device using a wattmeter or a cathode ray tube exclusively. If desired, a switch may be provided permitting null readings to be made either on a wattmeter or on a cathode ray tube mounted on the same apparatus. If desired, different frequencies may be supplied by the oscillator and check readings made.

It will thus be seen that there is provided an apparatus and method in which the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In the method of testing phase differences due to the impedance property in human individuals, the step of passing a current through the individual to be tested in series with a resistance of sufficient magnitude so that the current through the resistance and the voltage across the resistance and the individual taken together will be retained substantially in phase whereby the measured phase angle remains unaffected for values of impedance of different individuals between 100 and 1000 ohms.

2. A method for measuring the phase angle due to the impedance of an animal having properties of varying resistance and capacity due to changes in muscular tension, comprising the steps of passing an alternating current through the animal, and measuring the phase during changes of resistance and capacity, said measurement of phase being made so that the phase angle remains substantially independent of variations in the total impedance.

3. The method of measuring phase displacement of an unknown impedance by means of a circuit provided with a differential alternating current voltmeter and a variable resistance and a potentiometer mounted to divide the alternating current used for measurement comprising the steps of inserting the unknown impedance in series with the variable resistance and adjusting said variable resistance until the voltmeter reads zero, replacing the unknown impedance by a large condenser and adjusting the potentiometer until the voltmeter again reads zero, and throwing the unknown impedance across the large condenser and reading the voltmeter.

4. In a method of determining phase angle due to an unknown impedance body whose resistant component predominates, comprising the steps of measuring the change of impedance of said unknown impedance body with an additional resistance, measuring the impedance of a known impedance body whose reactance component predominates, and measuring the change of impedance due to change of reactance when said unknown impedance body is added to said known impedance body.

5. In a phase meter connected in an alternating current circuit of at least 9000 cycles passing through an impedance, a phase changer and a wattmeter having means connecting the wattmeter in the circuit with the phase changer for measuring the phase due to said impedance by an indication of the wattmeter, said phase changer and wattmeter being connected in circuit with said impedance so that the indications of said wattmeter remain substantially independent of variations in the value of said impedance.

6. The apparatus defined in claim 5, said means electrically isolating the wattmeter from the circuit with the impedance to be measured.

7. In a phase meter, a phase indicator responsive to phase displacement, a phase changer capable of varying the indications of phase displacement shown by said phase indicator and connected thereto, and amplifying means coupled in circuit with said phase indicator, said amplifying means functioning to increase the phase displacement through a change of frequency.

8. In a phase meter operating on an alternating current of sinusoidal character, a phase indicator, means for converting said alternating current into an alternating current of non-sinusoidal form, means for selecting a harmonic from the alternating current of non-sinusoidal form to be fed to the phase indicator thereby amplifying the phase indication and a phase changer connected in circuit with said phase indicator for varying the phase indication.

9. A phase measuring apparatus comprising a differential voltmeter including a diode tube connected in circuit with a galvanometer, a variable resistance connected in said circuit adapted to increase the voltage across a test impedance connected in series with said resistance, and means connecting with said voltmeter co-operative with said resistance for setting the galvanometer to a predetermined value, said means being adjustable for resetting the galvanometer to said value after replacing said impedance by another with said resistance in circuit.

10. In a method for measuring phase differences due to different unknown impedances, the steps of passing an alternating current through one unknown impedance and a resistance in series therewith, the value of said resistance in ohms being sufficiently greater than that of the impedance under test as to render the total phase angle negligible, impressing an alternating voltage substantially in phase with the voltage source of said first mentioned alternating current through a known variable impedance in which the resistance component predominates and comparing the phase angle of said unknown impedance with the phase angle of said known variable impedance for different reactive values of the variable impedance whereby the phase angle of a different unknown impedance may be compared with the unknown impedance under test independently of the value of their resistive components within predetermined limits.

11. In combination, a pair of input terminals, test terminals adapted to receive an impedance to be tested, a resistance in series with one of said test terminals, said resistance being of sufficient magnitude to bring the voltage and current substantially into phase when said resistance is traversed by an alternating current, phase rotating means including a reactance connected across said input terminals, means for supplying alternating current to said input terminals and means for indicating a function of the difference in phase produced by said phase rotating means and a test impedance connected across said test terminals.

12. A structure as defined in claim 11 in combination with means operative to vary the value of said reactance.

13. The method of indicating the instantaneous phase angle of a variable unknown impedance comprising the steps of coupling a resistance with said variable unknown impedance, said resistance being of sufficient magnitude to reduce the phase angle of the circuit including said unknown variable impedance and said resistance to a negligible value, passing an alternating current through said unknown variable impedance and the resistance coupled thereto and through a known variable impedance, comparing the phase angle of said known and said unknown variable impedance and adjusting the value of said known variable impedance until its effect on the phase relation between the current and voltage is the same as that of the unknown variable impedance.

14. In combination, terminals adapted to receive an impedance to be tested, a resistance in series with one of said terminals, a variable impedance including a resistance and a reactance, means for varying the relative values of said resistance and said reactance, means for supplying alternating current to said terminals and to said variable impedance and a watt-meter having one coil connected in circuit with said terminals and another coil in circuit with said variable impedance whereby the effects on the phase relation between current and voltage of said variable impedance and of an unknown impedance connected to said terminals may be compared.

15. In combination, terminals adapted to receive an impedance to be tested, a resistance in series with one of said terminals, a variable impedance including a resistance and a reactance, means for varying the relative values of said resistance and said reactance, means for supplying alternating current to said terminals and to said variable impedance, and a cathode ray tube including two pairs of deflecting plates, one pair of said plates being connected in circuit with said terminals and the other pair to said variable impedance.

16. A structure as defined in claim 15 in combination with means for increasing the frequency of the current fed to one pair of said deflecting plates.

SAMUEL BAGNO.